(12) United States Patent
Yamaguchi et al.

(10) Patent No.: US 7,522,791 B2
(45) Date of Patent: Apr. 21, 2009

(54) METHOD FOR FABRICATING POLARIZATION REVERSAL STRUCTURE AND REVERSAL STRUCTURE

(75) Inventors: Shoichiro Yamaguchi, Ichinomiya (JP); Yuichi Iwata, Nagoya (JP); Kengo Suzuki, Nagoya (JP)

(73) Assignees: NGK Insulators, Ltd., Nagoya (JP); NGK Optoceramics Co., Ltd., Komaki (JP)

( * ) Notice: Subject to any disclaimer, the term of this patent is extended or adjusted under 35 U.S.C. 154(b) by 162 days.

(21) Appl. No.: 11/713,238

(22) Filed: Mar. 1, 2007

(65) Prior Publication Data

US 2007/0258131 A1 Nov. 8, 2007

Related U.S. Application Data

(63) Continuation of application No. PCT/JP2005/018993, filed on Oct. 11, 2005.

(30) Foreign Application Priority Data

Oct. 14, 2004 (JP) .............................. 2004-299563

(51) Int. Cl.
*G02B 6/26* (2006.01)
*G02B 6/10* (2006.01)
*G02F 1/35* (2006.01)

(52) U.S. Cl. .......................... 385/40; 385/129; 359/326; 359/328

(58) Field of Classification Search ....................... None
See application file for complete search history.

(56) References Cited

U.S. PATENT DOCUMENTS

| 2002/0033993 A1* | 3/2002 | Furukawa et al. | 359/326 |
|---|---|---|---|
| 2002/0057489 A1 | 5/2002 | Nihei | |
| 2003/0133680 A1* | 7/2003 | Yokoyama et al. | 385/129 |
| 2004/0096160 A1* | 5/2004 | Hinkov et al. | 385/40 |

FOREIGN PATENT DOCUMENTS

| JP | 11-072809 A1 | 3/1999 |
|---|---|---|
| JP | 2002-214655 A1 | 7/2002 |
| JP | 2002-277915 A1 | 9/2002 |

* cited by examiner

*Primary Examiner*—Tina M Wong
(74) *Attorney, Agent, or Firm*—Burr & Brown (57) ABSTRACT

When a domain inversion part is produced by means of electric field polling process, damage in the vicinity of the forward end of a comb electrode and deviation of width of each domain inversion part are to be reduced. A polarization domain inversion structure has polarization domain inversion parts is produced by electric field poling process using a comb electrode formed on one surface of a substrate of a ferroelectric single crystal and of a single domain, and the comb electrode has a plurality of electrode portions and feeding portion. Each of the electrode portions corresponds with each domain inversion part of the domain inversion structure. The electrode portion has a plurality of low resistance pieces arranged in a direction "F" intersecting the longitudinal direction "E" of the electrode portion and spaced apart with each other.

4 Claims, 9 Drawing Sheets

METHOD FOR FABRICATING POLARIZATION REVERSAL STRUCTURE AND REVERSAL STRUCTURE

FIELD OF THE INVENTION

The invention relates to a method of producing polarization inversion parts by means of electric field poling process.

BACKGROUND OF THE INVENTION

Periodic domain inversion structure can be formed in a ferroelectric and non-linear optical crystal such as lithium niobate or lithium tantalite so as to generate second harmonic wave corresponding with the period. An optical waveguide can be easily formed in such crystals as lithium niobate or lithium tantalate, so that a device for generating second harmonic wave of high efficiency and small size can be provided. It is possible to generate light of a wavelength of ultraviolet, visible and infrared regions only with an excitation laser oscillating fundamental wave. The device can be applied in a wide variety of applications such as medical use, opt-chemical use and various kinds of optical measurement.

It is necessary to form deep polarization inversion structure in a ferroelectric single crystal, for attaining a high conversion efficiency in a second harmonic wave generation device. According to the method described in Japanese Patent publication No. H11-72809A, the surface of a substrate of a ferroelectric single crystal is inclined with respect to the polarization axis of the crystal by 3° and a comb electrode and rod-shaped electrode are formed on the surface of the substrate. Several low resistance portions are formed between the forward end of each electrode piece of the comb electrode and the rod-shaped electrode. Direct current voltage is then applied on the comb and rod-shaped electrodes, so that polarization inversion parts are formed corresponding with the electrode pieces of the comb electrode as well as the low resistance portions, respectively (FIG. 28).

DISCLOSURE OF THE INVENTION

According to prior methods, however, when it is tried to obtain periodic domain inversion structure having a period of, for example, about 10 µm or longer, damages may be generated at the forward end of a comb electrode due to the application of electric field. Further, the width of the inversed part proved to be different in the forward end and root of the comb electrode on the surface of a wafer. That is, the width of the inversed part tends to be larger at the forward end of the comb electrode and narrower at the root because the electric field is weaker at the root.

It is desired that the width of the periodic domain inversion part is constant as an ideal shape of the domain inversion part. That is, the periodic domain inversion part is normally formed in a substrate so that the polarization axis of a ferroelectric crystal forming the substrate is inclined with respect to the surface of the substrate as in the case of 5° off-cut substrate. When the width of each domain inversion part is changed on the substrate surface, the width of the domain inversion part should be changed in the direction of depth under the surface of the substrate. Such deviation of the width of the domain inversion part deteriorates the high frequency modulation property.

An object of the present invention is to reduce crack damage of a wafer due to dielectric breakdown in the vicinity of the forward end of a comb electrode and to reduce deviation of widths of domain inversion parts in the production of the domain inversion part by means of so-called electric field poling process.

The present invention provides a method of producing a polarization domain inversion structure comprising polarization domain inversion parts by electric field polling process using a comb electrode formed on one surface of a substrate of a ferroelectric single crystal of a single domain, said comb electrode comprising a plurality of electrode portions and feeding portion, wherein each of said electrode portions corresponds with each domain inversion part of said domain inversion structure, and wherein said electrode portion comprises a plurality of low resistance pieces arranged in a direction intersecting the longitudinal direction of the electrode portion and spaced apart with each other.

The present invention further provides a domain inversion structure produced by the method.

According to the present invention, each electrode portion has a plurality of low resistance pieces arranged in a direction intersecting the longitudinal direction of the electrode portion and spaced apart with each other.

That is, each electrode portion of the comb electrode corresponds with each inversion part of the domain inversion structure one by one, so that a gap is formed between adjacent electrode portions. Contrary to this, according to the present invention, each electrode portion itself is separated to electrode pieces in the direction of width of the electrode portion to provide a plurality of low resistance pieces. It is thus possible to relax the concentration of load onto the forward end of the comb electrode to prove the effects of preventing damage onto the substrate and of obtaining uniform domain inversion shapes, and the present invention is thus made.

BRIEF DESCRIPTION OF THE DRAWINGS

The patent or application file contains at least one drawing executed in color. Copies of this patent or patent application with color drawing(s) will be provided by the Office upon request and payment of the necessary fee.

PREFERRED EMBODIMENTS OF THE INVENTION

Figure 1:
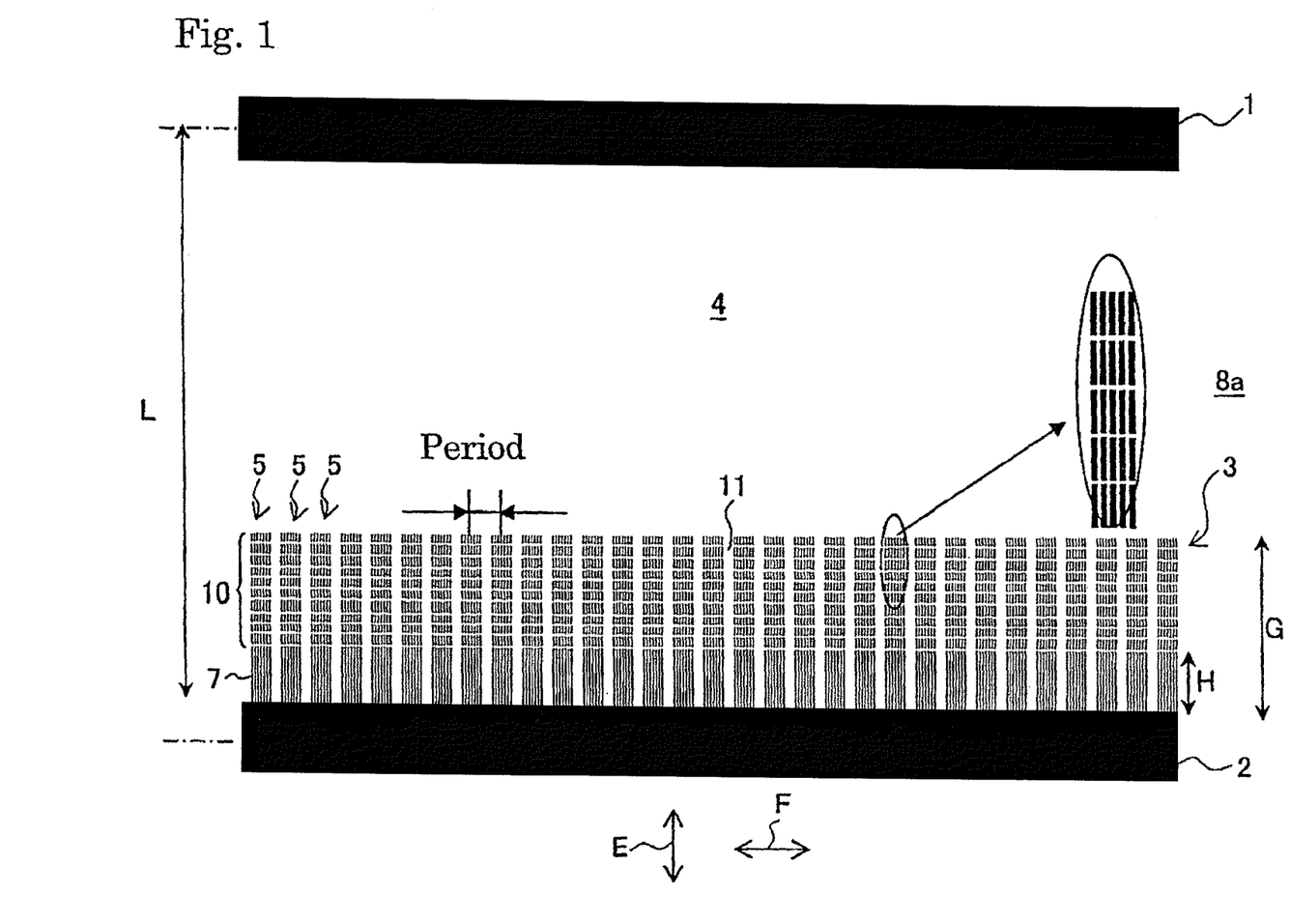
FIG. 1 is a plan view schematically showing pattern of comb electrode 3 and a opposing electrode 1 used in an example of the present invention.
Figure 2:
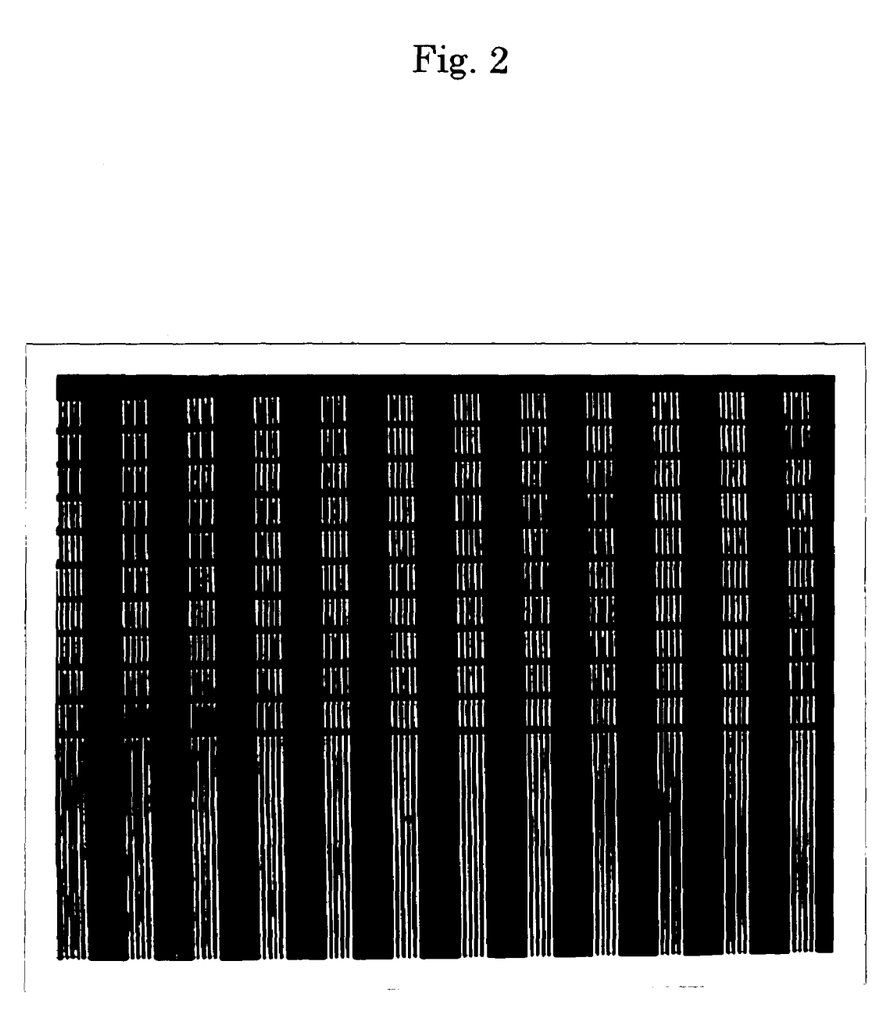
FIG. 2 is a photograph showing an enlarged view of the comb electrode shown in FIG. 1.
Figure 3:
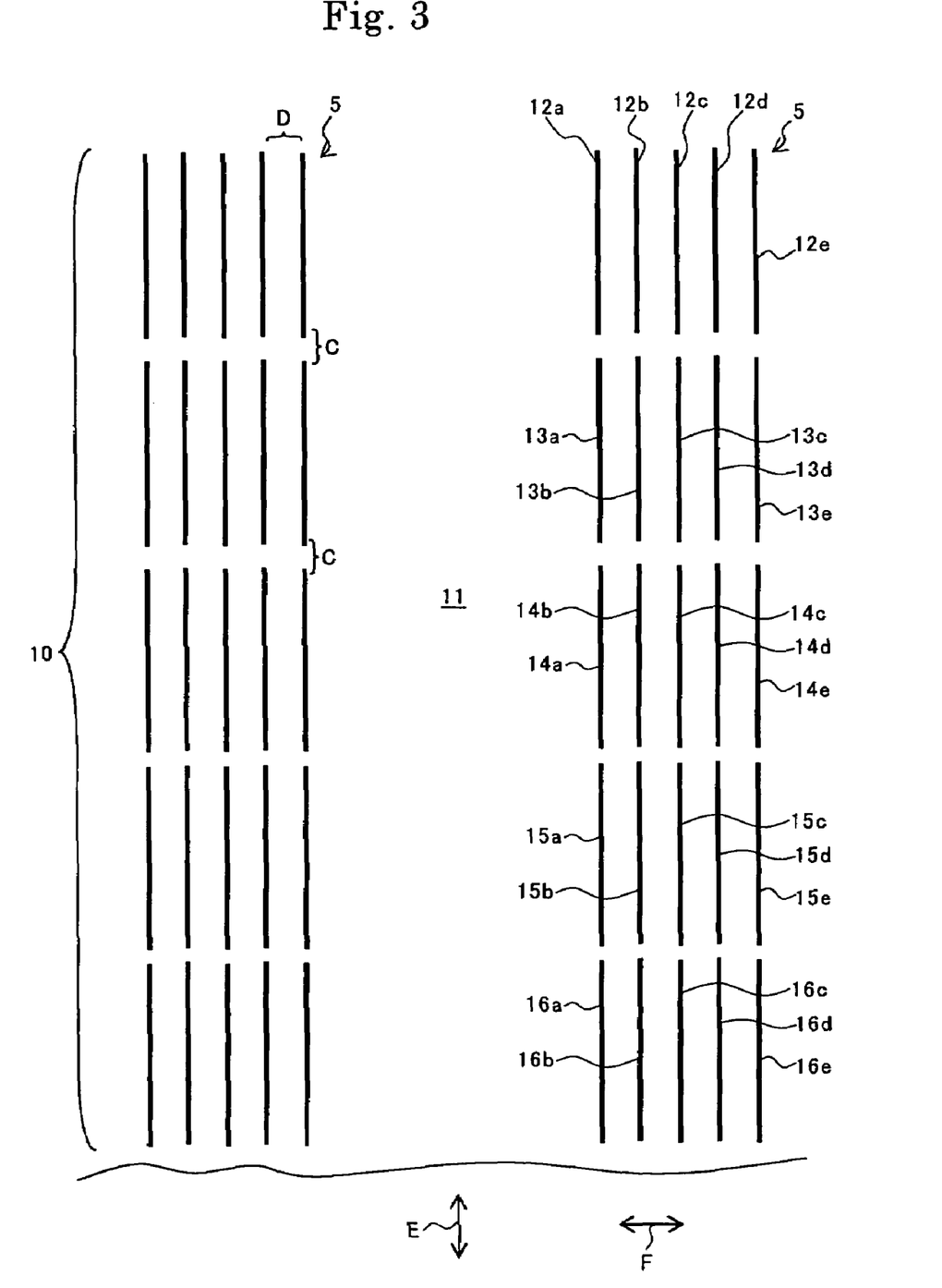
FIG. 3 is a plan view showing an example of a pattern of an arrangement 10 of low resistant portions.
Figure 5:
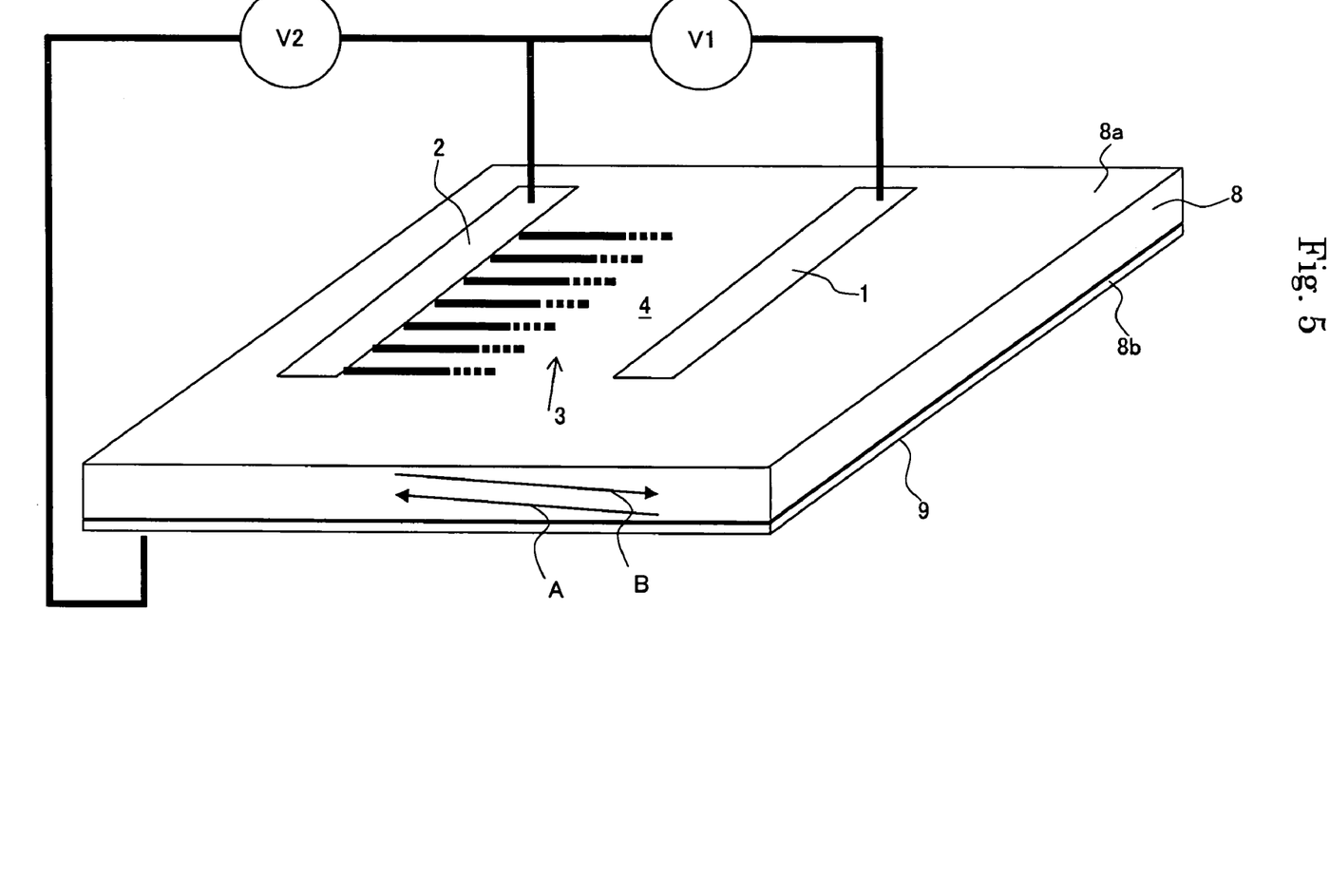
FIG. 5 is a perspective view schematically illustrating an electric field polling process.

FIG. 1 is a plan view showing a pattern of an electrode provided on a substrate. FIG. 2 is a photograph showing a planar pattern of an electrode portion of a comb electrode. FIG. 3 is an enlarged view of a forward end of each electrode portion. FIG. 5 is a perspective view showing the method of application of electric field poling process.

When a polarization inversion part is produced, an off-cut substrate made of a ferroelectric single crystal is used as the substrate 8. The polarization axis "A" of the ferroelectric single crystal is inclined with respect to a surface 8a and a back face 8b at a specific angle, such as 5°, so that the substrate 8 is called as "off-cut substrate".

A comb electrode 3 and an opposing electrode 1 are formed on the surface 8a of the substrate 8, and a uniform electrode 9 is formed on the back face 8b. The comb electrode 3 has many elongate electrode portions 5 arranged at a specific interval and an elongate feeding portion 2 connecting the roots of many electrode portions 5. The opposing electrode 1 is made of an elongate electrode piece and provided so that the opposing electrode opposes the forward ends of the electrode portions 5.

First, the whole of the substrate 8 is polarized in the direction "A" of non-polarization inversion. A voltage "V1" is then applied on the comb electrode 3 and opposing electrode 1, and a voltage "V2" is applied on the comb electrode 3 and uniform electrode 9. Polarization inversion parts are gradually generated from the respective electrode portions 5 in a direction "B". The direction "B" of polarization inversion is opposite to the direction "A" of non-polarization inversion. Besides, the non-polarization inversion parts are left in gaps between the adjacent polarization inversion parts, which do not correspond with the electrode portions. It is thereby produced a periodic polarization inversion structure having the polarization inversion parts and non-polarization inversion parts arranged alternately. An optical waveguide can be formed at a position where the periodic polarization inversion structure is formed.

Particularly as shown in FIG. 1, a comb electrode 3 and an opposing electrode 1 are formed on the surface 8a, and a uniform electrode 9 is formed on the back face 8b of a substrate 8. The comb electrode 3 has many elongate electrode portions 5A arranged at a specific interval and an elongate feeding portion 2 connecting the roots of many electrode portions 5. The opposing electrode 1 is made of an elongate electrode piece and provided so that the opposing electrode opposes the forward ends of the electrode portions 5.

First, the whole of the substrate 8 is polarized in the direction "A" of non-polarization inversion. A voltage "V1" is then applied on the comb electrode 3 and opposing electrode 1, and a voltage "V2" is applied on the comb electrode 3 and uniform electrode 9. Polarization inversion parts are gradually generated from the respective electrode portions 5A in a direction "B". The direction "B" of polarization inversion is opposite to the direction "A" of non-polarization inversion.

According to the present example, particularly as shown in FIGS. 1 and 3, each electrode portion 5 has a base portion 7 extending from a feeding portion 2, and an arrangement 10 of low resistance pieces separated from the base portion 7.

Each of the low resistance portions 10 is composed of a plurality of low resistance pieces separated in horizontal and vertical directions as shown in FIG. 3. That is, according to the present example, a gap 11 is provided between adjacent arrangements 10 of low resistance pieces. Each of the arrangements 10 of low resistance pieces has arrays of low resistance pieces separated in the direction "F" crossing at the longitudinal direction "E" of the electrode portion 5. At the same time, the arrangement 10 has a plurality of low resistance pieces separated in the direction "E" of the electrode portion 5.

Specifically, from the forward end of the electrode portion 5, low resistance pieces 12a, 12b, 12c, 12d and 12e are provided in the first array, low resistance pieces 13a, 13b, 13c, 13d and 13e are provided in the second array, low resistance pieces 14a, 14b, 14c, 14d and 14e are provided in the third array, low resistance pieces 15a, 15b, 15c, 15d and 15e are provided in the fourth array, and low resistance pieces 16a, 16b, 16c, 16d and 16e are provided in the fifth array. "C" represents a gap in the direction of an arrow "E" and "D" represents a gap in the direction of an arrow "F".

For example in the first array, the low resistance pieces 12a, 12b, 12c, 12d and 12e are arranged and spaced apart in the direction "F" substantially perpendicular to the longitudinal direction "E" of the electrode portion 5. Such arrangement is the same in the second to fifth arrays.

According to such structure, particularly at the forward end of the electrode portion 5, the concentration of load is relaxed so as to reduce damage generated from the forward end of the electrode portion 5. It is thus possible to make the width of the inversion part near a constant value over a relatively long distance along the arrangement 10.

According to the present invention, the electrode portion has arrays of low resistance pieces arranged in the direction "F" intersecting the longitudinal direction "E" of the electrode portion and spaced apart from each other. Preferably, as shown in the example of FIG. 3, a plurality of low resistance pieces are arranged in the direction "F" crossing the longitudinal direction "E" of the electrode portion at a right angle and spaced apart from each other. Although it is not required that the direction "F" of arrangement of the low resistance pieces crosses the longitudinal direction "E" at a right angle, on the viewpoint of the present invention, "E" and "F" are intersected preferably at an angle of 85 to 95° and more preferably at an angle of 88 to 92°.

Figure 4:
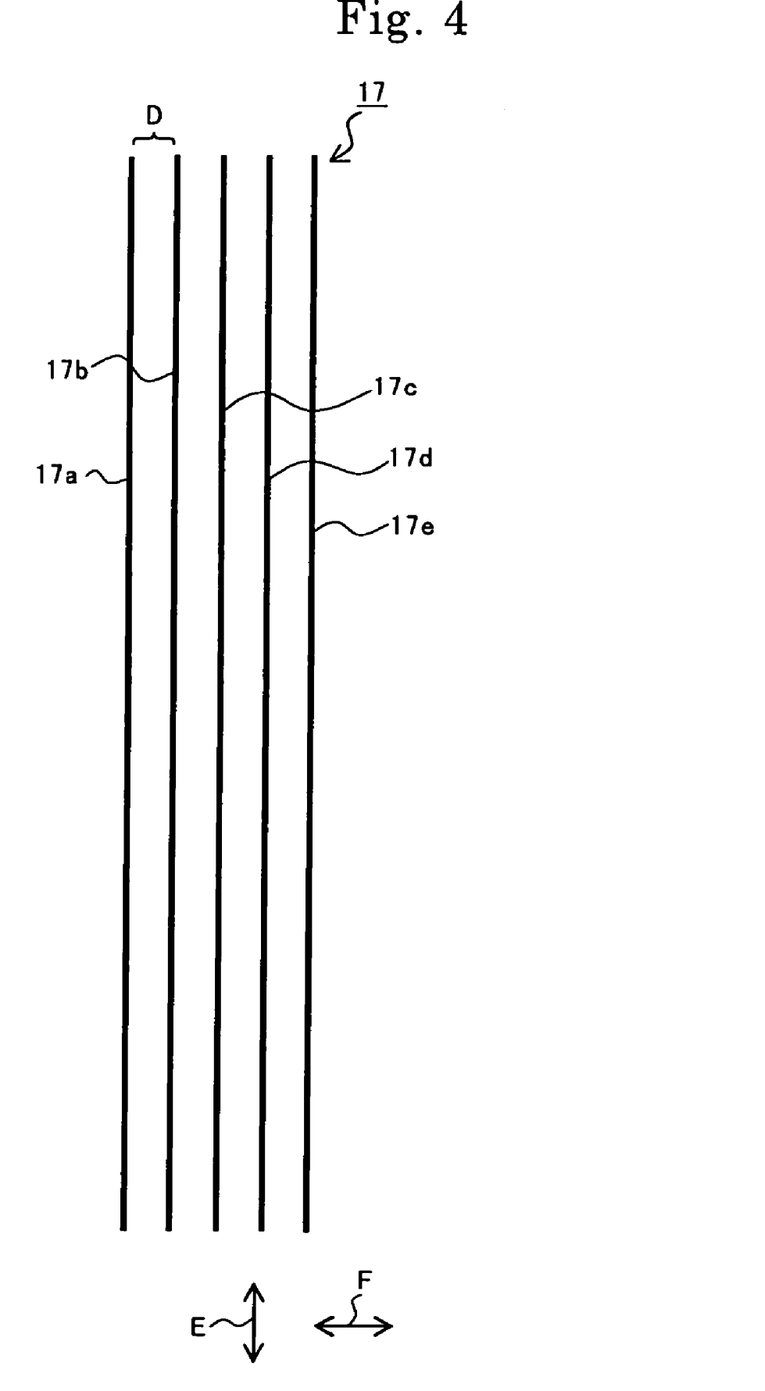
FIG. 4 is a plan view showing an example of a pattern of an arrangement 17 of low resistance portions according to another embodiment.

According to the present invention, preferably, for example as shown in FIG. 3, each electrode portion has a plurality of low resistance pieces spaced apart from each other in the longitudinal direction "E" of the electrode portion. This requirement is, however, not essential. For example, according to the example shown in FIG. 4, the electrode portion 17 has a plurality of low resistance pieces 17a, 17b, 17c, 17d and 17e arranged and spaced apart in the direction "F". The low resistance pieces 17a to 17e are, however, not spaced apart in the longitudinal direction "E".

According to the present invention, although a distance "L" between the feeding portion 2 (refer to FIG. 1) and the opposing electrode 1 is not particularly limited, it may preferably be 0.2 to 1 mm, for example. Although "L" may exceed 1.0 mm, when "L" is too large on a limited substrate area, the number of fabricated devices would become smaller. "L" is thus appropriately 1 mm or smaller. The period of the domain inversion is not particularly limited. In the case that the period of the domain inversion would be 5 μm or more or even 10 μm or more, however, the cracks at the edge of the forward end of the electrode portion and deviation of the width of the domain inversion part tends to be generated. Therefore, the present invention is particularly useful in the case that the period of domain inversion is 5 μm or more or 10 μm or more.

According to a preferred embodiment, each electrode portion 5 has a continuous base portion 7 and an arrangement 10 of low resistance pieces composed of a plurality of low resistance pieces spaced apart from each other in the arrow "E".

Although it is possible to omit the base portion 7 and gaps are provided over the whole length of the electrode portion for separating the low resistance pieces, it becomes difficult to supply current to the forward end of the electrode in this case. It is thus preferred to provide a base portion 7 continuously formed to a extent. On the viewpoint, a ratio "H/G" of the length "H" of the base portion 7 with respect to the whole length "G" of the electrode portion may preferably be 0.1 or more and more preferably be 0.15 or more.

On the other hand, in the case that a gap is not formed over the whole length of the electrode portion 5, an amount of current supply to the forward end of the electrode portion 5 is increased so that dielectric breakdown tends to occur. On the viewpoint, the ratio "H/G" of the length "H" of the base portion 7 with respect to the whole length "G" of the electrode portion may preferably be 0.5 or smaller and more preferably be 0.3 or smaller.

A gap "C" (refer to FIG. 3) of the low resistance pieces adjoining in the direction "E" may preferably be 0.3 to 3 μm and more preferably be 1 to 2 μm, on the viewpoint of the present invention. Further, the gap "D" (refer to FIG. 3) of the low resistance pieces adjoining in the direction of the arrow "F" may preferably be 0.3 to 2 μm and more preferably be 0.3 to 1 μm, on the viewpoint of the present invention.

The width of the low resistance piece, such as each of the low resistance pieces 12a, 12b, 12c, 12d and 12e in the first array and each of the low resistance pieces in the second or the latter arrays, may preferably be 0.3 to 2 μm and more preferably be 0.4 to 1.5 μm, on the viewpoint of the effects of the present invention. Further, the length of low resistance piece, such as pieces 12a, 12b, 12c, 12d and 12e in the first array or the low resistance pieces in the second or the latter arrays, may preferably be 4 to 20 μm and more preferably be 6 to 10 μm.

Further, it is further preferred to increase the length of the low resistance piece from the low resistance pieces 12a to 12e of the first array toward the base portion 7.

The number of the arrays of the low resistance pieces in the direction of the arrow "F" is not particularly limited, as far as it is 2 or more. As the number of arrays is larger, the concentration of load to the forward end of the electrode portion is reduced more. On the viewpoint, the number of arrays of low resistance pieces in the direction "F" may preferably be 4 or more. As the number of the arrays of the low resistance pieces is too large, however, the formation of the pattern of the low resistance pieces would be difficult or the effects would not be substantial. The number is thus preferably be 8 or smaller, for example, in the case of a period of 10 μm. This does not necessarily apply in the case that the period is more than 10 μm.

The method of forming the low resistance pieces includes the process of providing electrical conductivity onto the surface of the substrate by forming an oxygen-depleted layer. However, it is preferred a method of patterning with a metal such as Al, Cr—Au, Ag, Cr, Cu, Ni, Ni—Cr, Pd, Ta or Mo because of a higher precision.

The kind of a ferroelectric single crystal forming the substrate is not particularly limited. The material may more preferably be each of the single crystals of lithium niobate (LiNbO$_3$), lithium tantalite (LiTaO$_3$), a solid solution of lithium niobate-lithium tantalate, or K$_3$Li$_2$Nb$_5$O$_{15}$.

The ferroelectric single crystal may contain one or more metal element(s) selected from the group consisting of magnesium (Mg), zinc (Zn), scandium (Sc) and indium (In) for further improving the resistance against optical damage of a three-dimensional optical waveguide formed therein. Magnesium is particularly preferred.

The ferroelectric single crystal may contain a rare earth element as a dopant. The rare earth element is capable of acting as an additive for laser oscillation. The rare earth element may preferably be Nd, Er, Tm, Ho, Dy or Pr.

A so-called off-cut substrate may be used, so that a deeper polarization inversion structure can be obtained, compared with that obtained using a non-offcut x-cut or y-cut substrate. When the off-cut angle is as small as about 5°, it is possible to reduce a degradation of efficiency due to mismatch of planes of polarization and to perform the wavelength conversion at a high efficiency, normally without the need of adjusting the optical axis with that of a semiconductor laser emitter at TE mode and the angle corresponding with the off-cut angle. However, as the off-cut angle becomes larger, a degradation of the efficiency due to the mismatch of the planes of polarization is increased. In such case, it is necessary to adjust the angle so that the mismatch of the planes of polarization is reduced.

The off-cut angle is not particularly limited. The angle may more preferably be 1° or more, or, 20° or less.

Further, so-called X-cut substrate, Y-cut substrate or Z-cut substrate may be used as the substrate. When X-cut substrate or Y-cut substrate is used, the uniform electrode may be provided on one surface without providing on the back face of the substrate so that a voltage may be applied on the comb and uniform electrodes. In this case, the opposing electrode may be omitted or may be left as a floating electrode. Further, in the case that a Z-cut substrate is used, the uniform electrode may be provided on the back face so that a voltage is applied on the comb and uniform electrodes. In this case, the opposing electrode is not indispensable or may be left as a floating electrode.

EXAMPLES

Experiment 1

Periodic polarization inversion structure was formed by electric field poling process, according to the process described referring to FIGS. 1 to 3 and 5. The distance "L" between the feeding portion 2 and opposing electrode 1 was made 400 μm, the period of domain inversion was made 18 μm, the whole length "G" of the electrode portion 5 was made 150 μm, the height "H" of the base portion 7 was made 60 μm, the number of the gaps "C" in the direction "E" was made 10 (11 arrays), the number of the gaps "D" in the direction "F" was made 4 (5 arrays), the gap "C" was made 1 μm and the gap D was made 0.5 μm. FIG. 2 is a photograph showing an enlarged view of the comb electrode actually patterned. According to this example, Ta metal was used for the patterning.

The electrode pattern was formed on the surface of the substrate, and the uniform electrode was patterned onto the back face of the substrate. A voltage was applied according to the pattern shown in FIG. 5. Further, although a voltage of V1 was applied between the comb electrode and the opposing electrode in FIG. 5, the polarization inversion structure could be formed without applying V1 and without the corresponding wiring in actual application of the voltage. The following description thus shows the conditions of the voltage application of only V2.

A 5° y-off cut substrate, made of LiNbO$_3$ doped with MgO, was used, because the shape of the domain inversion can be easily observed and the depth of the domain inversion in the direction of thickness of the substrate can be made large in the actual fabrication of a device. The substrate doped with MgO has superior resistance against optical damage compared with a LiNbO₃ substrate without doping to obtain a wavelength converting device of a high output. The 5° off-cut substrate, as well as a substrate of any off-cut angle, can provide a deeper domain inversion. If the angle is too large on the fabrication, the efficiency of wavelength conversion is lower when the angle would not be adjusted with respect to excited light. The angle of 5° was applied as an angle of enabling the wavelength conversion at a high efficiency without the need of an accurate adjustment of the angle. The used substrate had a thickness of 0.5 mm.

As the conditions of the application of voltage, a pulse voltage of 1.6 kV and a pulse width of 100 msec were applied 20 times with a pulse interval of 1 second, while a bias voltage V2 of 1.6 kV was superimposed. It was thus formed the domain inversion pattern shown in FIG. 6. However, the pattern shown in FIG. 6 was obtained by subjecting the surface of the substrate to etching treatment using hydrofluoric and nitric acids.

Comparative Example 1

The domain inversion structure was formed according to the same procedure as the example 1.

However, each electrode portion 5 was constituted to have one array without separating it to a plurality of low resistance pieces in the direction of the arrow "F". The thus obtained surface of the substrate was etched with hydrofluoric and nitric acids to obtain the shape as shown in FIG. 7. However, the outer shapes of the inversion parts were different from each other in FIGS. 6 and 7, because the conditions of the etching with hydrofluoric and nitric acids were different with each other.

Figure 6:
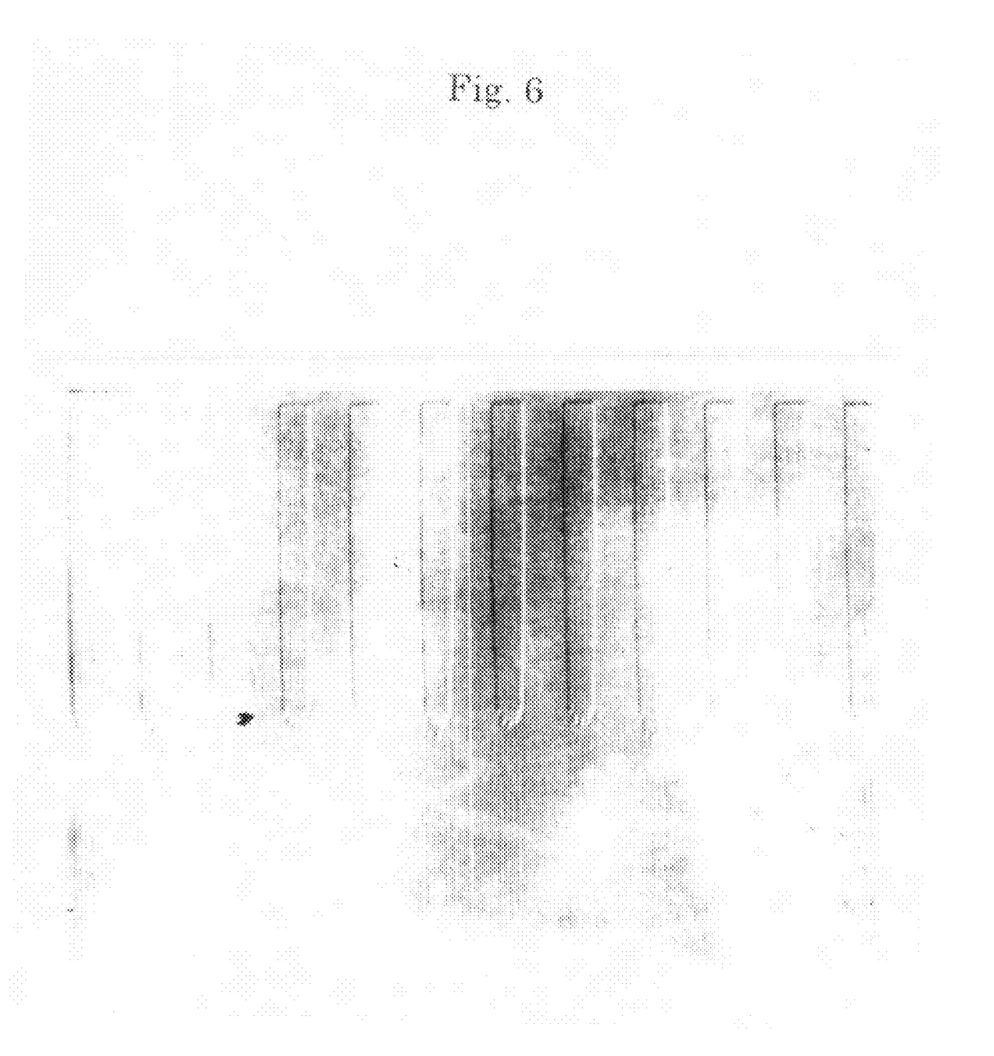
FIG. 6 is a plan view showing a pattern of a periodic domain inversion structure obtained by the inventive method.
Figure 7:
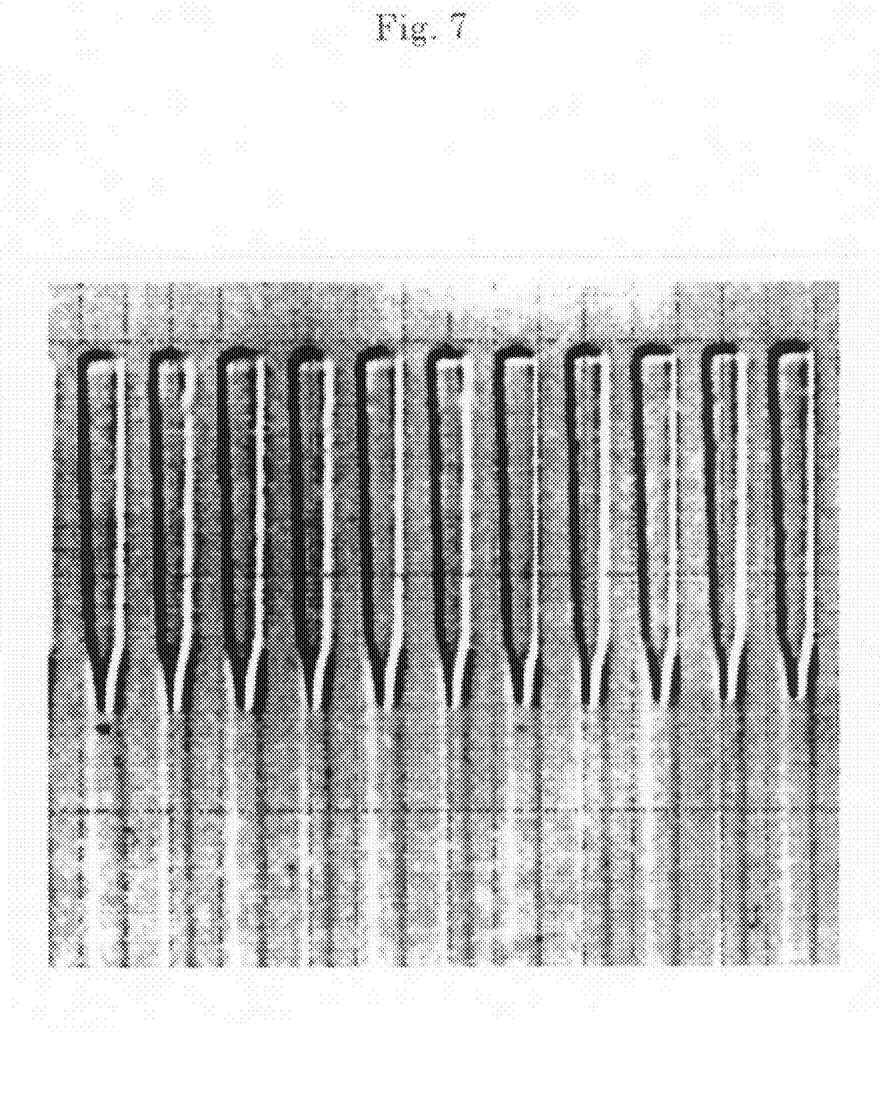
FIG. 7 is a plan view showing of periodic polarization inversion structure obtained by a method of a comparative example, where the width of the polarization inversion part is considerably changed.

According to the example shown in FIG. 6, it was obtained a shape of uniform width from the forward end toward the root of the electrode to prove superior uniformity. According to the comparative example shown in FIG. 7, the electric field intensity was strongest at the forward portion of the electrode, so that the forward portion is easily inversed and the width tends to be larger. Contrary to this, according to the example shown in FIG. 6, it is easy to make the electric field of each electrode portion constant by providing the gaps. It is considered that the shape of the inversion can thus be made uniform. According to the wavelength conversion device using LiNbO₃, it is desired that the shape of the domain inversion part is uniform, so that a device of a high efficiency can be expected.

Figure 8:
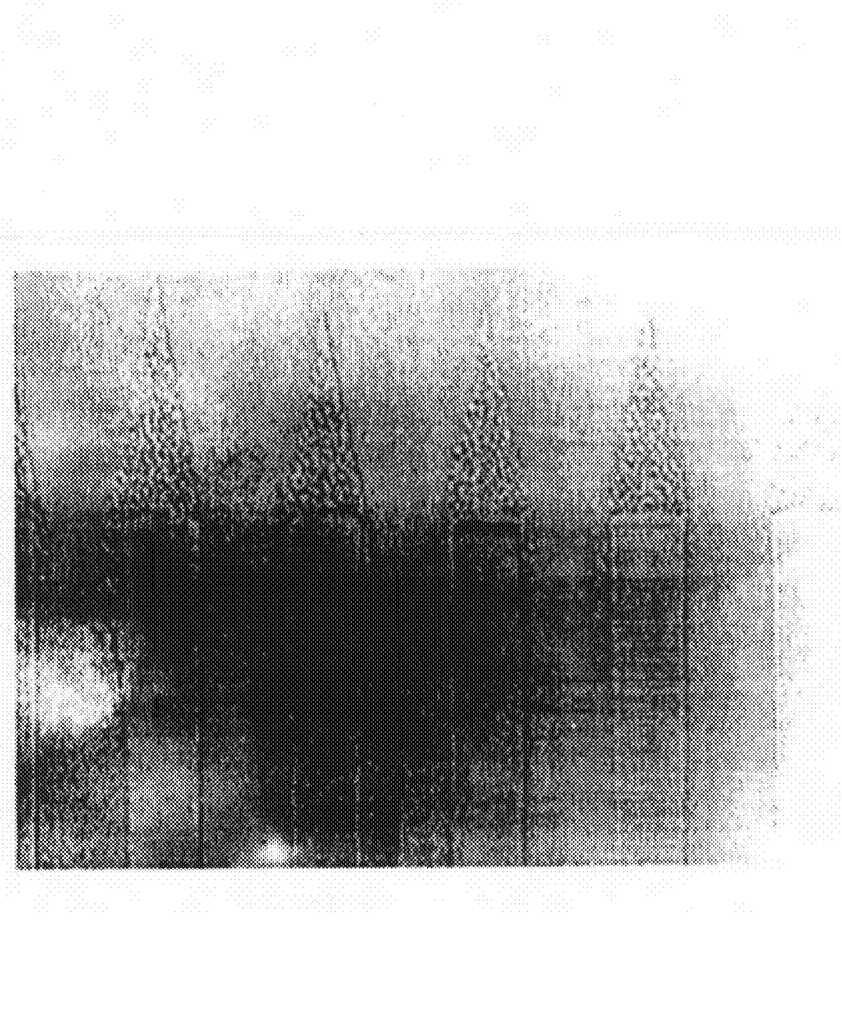
FIG. 8 is a plan view showing a pattern of a periodic domain inversion structure obtained by a comparative example, wherein black crack is observed along the edge at the forward end of the electrode.
Figure 9:
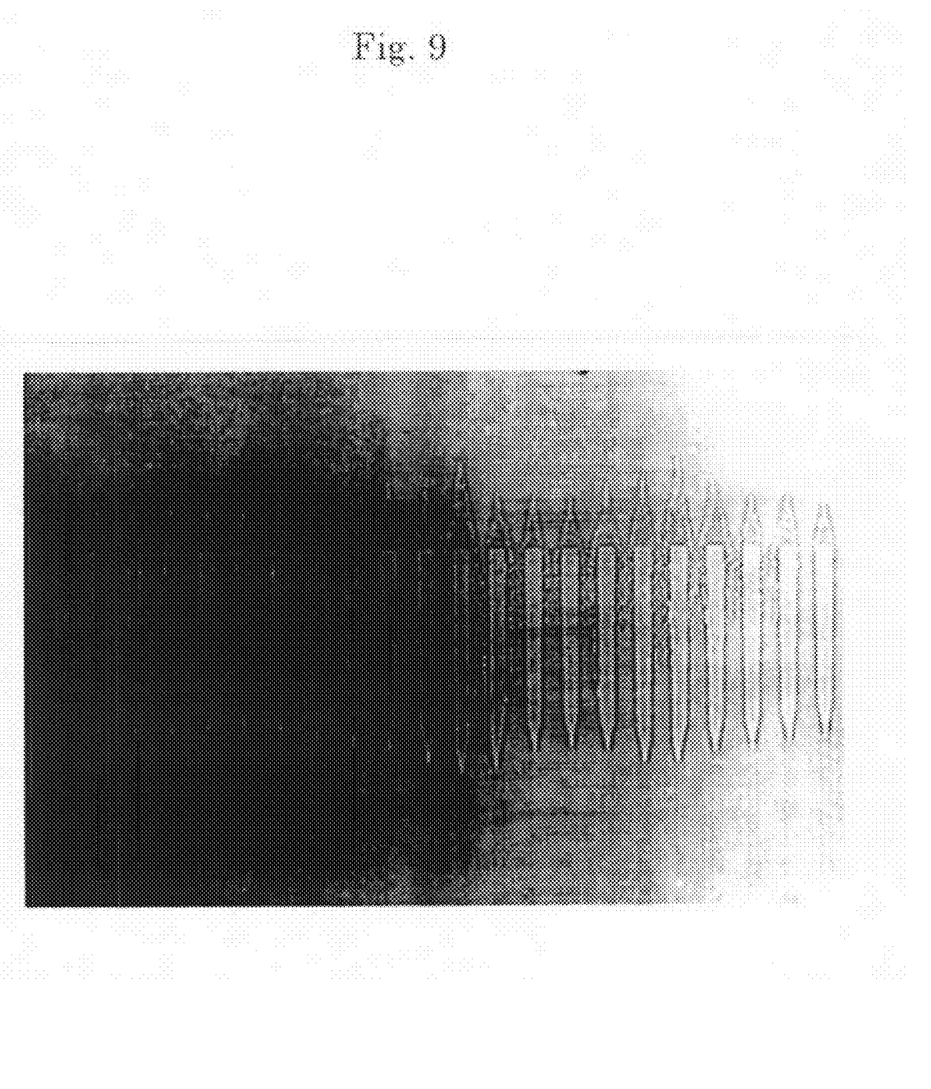
FIG. 9 is a plan view showing a pattern of a periodic domain inversion structure obtained by a comparative example, wherein substantial deviation is observed in the length and width of the domain inversion part.

Further, FIGS. 8 and 9 show other examples of patterns formed according to the method of comparative example 1.

According to the comparative example of FIG. 8, black damage part (crack) was generated at the forward end of the electrode. According to the comparative example of FIG. 9, the deviation of the length of the inversion part was significant.

According to the electrodes of the comparative example without the gaps in the direction of the arrow "F", the loads tend to be excessively concentrated onto the forward end of the electrode upon the application of voltage. Dielectric breakdown was thus induced in the substrate so that cracks may be generated as blackish cracks shown in FIG. 8. Such cracks tend to be generated during the formation of the periodic domain inversion structure having a long period of more than 10 μm, and the occurrence is low in the case that the period is shorter than about 10 μm. Further, the cracks does not occur in the case that the period is shorter than 5 μm. However, when the domain inversion part having a period of 10 μm is formed and load tends to be concentrated at a certain part of the comb electrode, if such cracks as those shown in FIG. 8 would have not be observed, the inversion would be easily generated at the certain part. It results in the deviation of the shape of the inversion parts as shown in FIG. 9.

Example 2

The domain inversion structure was formed according to the same procedure as the example 1. However, the pattern of the comb electrode was shown in FIG. 4 and the gaps in the direction of the arrow "E" were not formed. As a result, it was obtained the shape of a constant width from the forward end toward the root of the electrode and cracks were not generated.

The invention claimed is:

1. A method of producing a polarization domain inversion structure comprising polarization domain inversion parts by electric field poling method using a comb electrode provided on a surface of a substrate comprising a ferroelectric single crystal and of a single domain, said comb electrode comprising a plurality of electrode portions and a feeding portion,
    wherein each of said electrode portions corresponds with each of said domain inversion parts, and wherein said electrode portion comprises a plurality of low resistance pieces arranged in a direction intersecting the longitudinal direction of said electrode portion and spaced apart with each other.

2. The method of claim 1, wherein each of said electrode portions comprises a plurality of low resistance pieces spaced apart in the longitudinal direction of said electrode portion.

3. A polarization domain inversion structure produced by the method of claim 1.

4. A polarization domain inversion structure produced by the method of claim 2.

* * * * *